US009225153B1

(12) United States Patent
Anderson et al.

(10) Patent No.: US 9,225,153 B1
(45) Date of Patent: Dec. 29, 2015

(54) MULTI-FUNCTION WIRE STRIPPING HAND TOOL AND KIT AND METHOD FOR USING THE SAME (71) Applicants: Wayne Anderson, Northport, NY (US); Warren Anderson, Northport, NY (US)

(72) Inventors: Wayne Anderson, Northport, NY (US); Warren Anderson, Northport, NY (US)

( * ) Notice: Subject to any disclaimer, the term of this patent is extended or adjusted under 35 U.S.C. 154(b) by 0 days.

(21) Appl. No.: 14/789,018

(22) Filed: Jul. 1, 2015

Related U.S. Application Data (60) Provisional application No. 62/139,344, filed on Mar. 27, 2015.

(51) Int. Cl.
*H02G 1/12* (2006.01)
*B25F 1/02* (2006.01)

(52) U.S. Cl.
CPC ............... *H02G 1/1214* (2013.01); *B25F 1/02* (2013.01)

(58) Field of Classification Search
CPC ....... B25F 1/02; H02G 1/1209; H02G 1/1214
USPC ................................. 7/108, 107, 168; 81/440
See application file for complete search history.

(56) References Cited

U.S. PATENT DOCUMENTS

| | | | | | |
|---|---|---|---|---|---|
| 4,607,544 A | * | 8/1986 | Jewell, Jr. | ............ | H02G 1/1214 7/107 |
| 4,722,140 A | * | 2/1988 | Miceli | ........................ | B26B 1/02 30/153 |
| 4,932,124 A | * | 6/1990 | Pyun | .................... | H02G 1/1297 7/107 |
| 5,743,582 A | * | 4/1998 | Rivera | .................... | B25F 1/003 7/168 |
| 6,119,561 A | * | 9/2000 | Anderson | ............... | B25F 1/003 81/440 |
| 7,665,389 B2 | * | 2/2010 | Frazer | ........................ | B25F 1/04 81/9.4 |

* cited by examiner

*Primary Examiner* — Hadi Shakeri
(74) *Attorney, Agent, or Firm* — Andrew F. Young, Esq.; Lackenbach Siegel, LLP (57) ABSTRACT

A multi-function wire stripping hand tool and a kit including the hand tool is disclosed. The multi-function wire stripping hand tool includes first and second members that are pivotably secured to one another. One or both of handle sections of the first and second members include a plurality of tool bits that are useable for a variety of operations. A wire stripping mechanism including wire stripping blades that are coupled to the handle sections of the first and second members along either the width or the length of the handle sections, and is configured to strip an insulating layer from a wire without damaging its core. When a wire is placed between the wire stripping blades and the handles are pivoted together, the blades engage the wire and cut the wire to a predetermined depth that is sufficient to strip the insulating layer from the wire.

13 Claims, 5 Drawing Sheets

PRIOR ART

MULTI-FUNCTION WIRE STRIPPING HAND TOOL AND KIT AND METHOD FOR USING THE SAME

CROSS REFERENCE TO RELATED APPLICATIONS

The present application claims priority from U.S. Prov. Ser. No. 62/139,344 filed Mar. 27, 2015, the entire contents of which are incorporated herein by reference.

The present application relates to, but does not claim priority from, U.S. Ser. No. 14/671,276 filed Mar. 27, 2015 which in turn claims priority to U.S. Prov. Ser. No. 61/972,757, which was filed on Mar. 31, 2014, the entire disclosure of each of which is hereby also incorporated by reference.

BACKGROUND OF THE INVENTION

1. Field of the Invention

The present disclosure relates generally to hand tools. More particularly, the present disclosure relates to a multi-function device that includes the functionality to strip the insulation cover from an insulated wire, e.g., an insulated electrical wire.

2. Description of the Related Art

Multi-functional or multipurpose tools are widely popular for their utility in a substantial number of different applications. Such multi-functional tools include a number of tools carried by a common frame. Multi-functional tools may include such tools as a pair of pliers, a wire cutter, a bit driver, knives, a saw blade, a bottle opener, and/or the like. Multi-functional tools are particularly desirable because they provide a wide range of functionality with a single tool, thereby reducing the need to carry a number of relatively bulky different tools to perform the same or similar functions.

Multi-functional tools may include combinations of tools that are particularly useful and specifically designed for particular applications or markets. One such niche market is for electrical applications. Electrical repairs routinely require cutting and/or joining electrical wires to form desired electrical connections. Electrical wires typically include an inner core of a conductor material that is surrounded by an insulation layer. When the electrical wire is joined to other wires or connected to a terminal, the insulation layer needs to be removed such that an electrical connection may be made between the conductive inner core of the wire and the other wire or terminal.

For small gauge wires, a pair of wire stripping pliers, a utility knife, or other hand tool may be used to remove the insulation layer of the wire to expose its inner conductive core. For larger gauge wires having a relatively thicker and more rigid insulation layer, the removal of the insulation layer may be more difficult. In either case, when removing the insulation layer, care must be taken not to damage the inner conductive core of the wire as damage may be caused to the underlying conductor when penetrating the insulation layer with a manual cutting tool (such as a wire cutter or knife) due to imprecise cutting depth control.

While various tools have been devised to facilitate removal of a short segment of the insulation layer from the wire to expose the inner conductive core while inhibiting damage to the core during the removal of the outer insulation layer, a continuing need exists for tools, particularly multi-functional tools, which can facilitate wire stripping.

SUMMARY OF THE DISCLOSURE

A multi-function wire stripping hand tool is disclosed. The tool may include a first member and a second member that are pivotably connected to one another and a configured for relative movement between a closed position and an open position. The first member may include a first handle section and a first jaw member and the second member may include a second handle section and a second jaw member. Pivotal movement of the first and second handle sections together may cause a corresponding movement of the first and second jaw members together and vice versa. A biasing element that is positionable to bias ends of the first and second handle sections apart from one another. The biasing member may be retained within the second handle section and is pivotable to a useable position out from the second handle section, and the first handle section may be shaped and configured to engage the biasing member when the biasing member is in the useable position.

A first bit driver may be coupled to the first handle section and may include one or more bit chambers for the reception of one or more first tool bits in each of the one or more first bit chambers. A second bit driver may be coupled to the second handle section and may include one or more second bit chambers for the reception of one or more second tool bits in each of the one or more second bit chambers. The first handle section may define a first longitudinal axis and the second handle section may define a second longitudinal axis. At least some of the one or more first tool bits may be pivotable out from the first bit chamber to a useable position relative to the first longitudinal axis first handle section, and at least some of the one or more second tool bits may be pivotable out from the second bit chamber to a useable position relative to the second longitudinal axis of the second handle section.

A wire stripping mechanism may be coupled to the handle and may include a first stripping blade secured to the first handle section and a second stripping blade secured to the second handle section. Relative, pivotal movement of the first and second handle sections toward one another causes a corresponding movement of the blades closer together.

The first and second stripping blades may include surfaces that are shaped to correspond to the curvature of the wire such that the blades may securely receive and contact the outer circumference of a wire placed between the blades. For example, the first and second stripping blades may be shaped include grooves that cooperate with one another to receive a length of an insulated wire therethrough. The end of the blade may be slanted and/or tapered to facilitate cutting. The grooves of the first and second stripping blades may be aligned to receive the wire therebetween such that when the blades are brought together the wire may be snuggly positioned therebetween and the blades may apply a cutting force to the circumference of the wire. When the first and second handle sections are in the closed position relative one another, the aligned grooves of the first and second stripping blades retain a gap therebetween having a predetermined size such that the first and second stripping blades are configured to cut only partially into the wire along a circumference thereof and not into the conductive core of the wire.

The first and second stripping blades may be secured to the first and second handle sections, respectively, along either their widths or their lengths, so long as the blades are aligned such that the wire may be positioned therebetween. When secured along the length of the handle sections, the first stripping blade is recessed with respect to an outer side surface of the first handle section and the second stripping blade is recessed with respect to an outer side surface of the second handle section such that when the handle sections are gripped by a user the blades are inhibited from contacting the user's hand.

For example, the first stripping blade is press fit into one of the one or more first bit chambers and the second stripping blade is press fit into one of the one or more second bit chambers. The first and second stripping blades are positioned relative to one another in a generally parallel, non-collinear orientation when the first and second handles are substantially in the closed position. Such positioning may faciliate cutting and/or stripping of the wire.

A kit may include the hand tool described herein along with one or more first and second tool bits that may be coupled, for example, to the hand tool to enhance its functionality. The kit may further include a storage container or container having a plurality of cavities for receive-ably housing said hand tool and said one or more tool bits. The one or more first and second tool bits may, for example, be selected from the group consisting of a flat head screw driver bit, a crossed head screw driver bit, a hexagonal nut head, a pointed head, a saw blade, a knife, a file, and a scissor. However, different combinations and varieties of tool bits may be included.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein that define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. The term proximal refers to the end of the device that would be closest to the user when the user is grasping the device. The term distal refers to the end of the device that would be farther away from the user when grasping the device. These and similar directional terms should not be construed to limit the scope of the invention in any manner.

Figure 1:
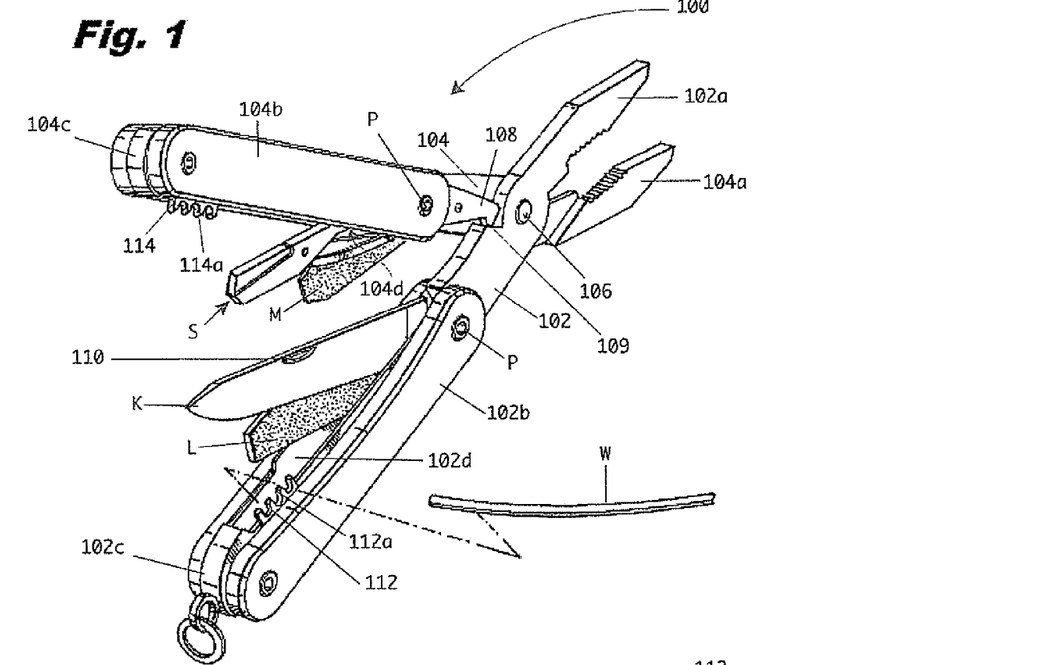
FIG. 1 is a perspective view of a first embodiment of a multi-tool device including a handle section having a wire stripping bit in accordance with the present disclosure shown in a first condition relative to an insulated wire.
Figure 2:
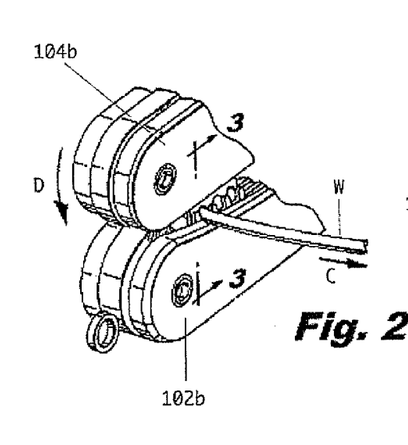
FIG. 2 is a cutaway perspective view of the device of FIG. 1 shown in a second condition engaging the insulated wire.
Figure 3:
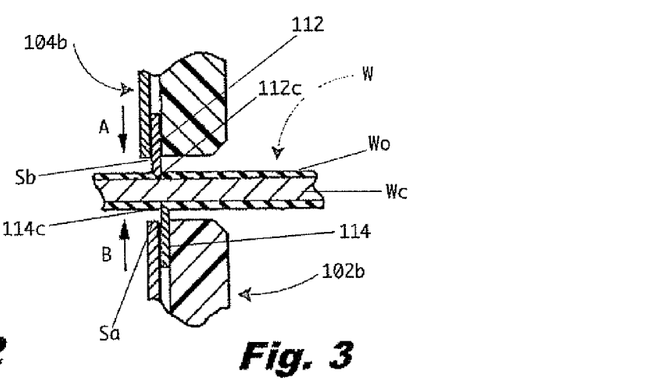
FIG. 3 is a cross-sectional view of the device as shown in FIG. 2 taken along section-line 3-3.

Referring to FIGS. 1-3, a first multi-function wire stripping hand tool device 100 will now be described. As shown in FIG. 1, the device 100 may include a first member 102 and a second member 104 that are pivotably connected to one another at pivot joint 106. A biasing member 108 may be pivotably secured within the second handle section 104 and may be pivoted out from the second handle section 104 about pivot joint P.

The first member 102 may include a first jaw member 102*a* and a first handle section 102*b*. The second member 104 may include a second jaw member 104*a* and a second handle section 104*b*. The first handle section 102*b* may include a bit driver 102*c* that includes one or more bit chambers 102*d*.

Similarly, the second handle section 104b may include a bit driver 104c that includes one or more bit chambers 104d. A tool bit, (e.g., scissors S, file M, file L, knife K) may be secured to the within one of the bit chambers 102d, 104d. The tool bits may be pivotably secured to the handle sections 102, 104 at their respective pivot joints P. When not being used, the tool bits may be aligned along the longitudinally extending axes of the handle sections 102, 104, and may be pivoted toward a useable position by pivoting or rotating the tool bit out from the bit chamber 102d in which it was positioned. A notch 110 may be formed within the tool bit such that it may be gripped or grasped and transitioned toward the useable position.

The biasing member 108 may be shaped to engage a notch 109 formed in the first member when the biasing member 108 is so positioned. When so positioned, the biasing member 108 resists relative movement of the second handle section 104b toward the first handle section 102b, that is, along directional arrow D (FIG. 1) such that the handle sections 102b, 104b will return automatically to the initial, radially spaced apart position as shown in FIG. 2.

A stripping mechanism may include a first stripping blade 112 and a second stripping blade 114. The blades 112, 114 are each configured to have a sharp or slanted edge 112c, 114c that can penetrate through the material forming the insulating layer Wo of the wire W. The first stripping blade 112 may be fixedly secured at a proximate end of the first handle section 102b and disposed along a length thereof. The first stripping blade 112 may be secured within one of the bit chambers 102d and may be spaced or recessed a distance from a side of the first handle section 102b such that a user's hand is less likely to contact the blade 112 during gripping of the handle section 102b. Similarly, the second stripping blade may be fixedly secured at a proximate end of the second handle section 104b and disposed along a length thereof. The second stripping blade 114 may be secured within one of the bit chambers 104d and may be spaced or recessed a distance from a side of the second handle section 104b such that a user's hand is less likely to contact the blade 114 during gripping of the handle section 104b. As shown in FIG. 3, the blades 112 and 114 may be generally parallel to one another, aligned along parallel but not collinear axes. Such an arrangement of the blades 112 and 114 may facilitate stable gripping of the wire W therebetween and stripping of the outer layer Wo of the wire W to expose its core Wc. The blades 112 and 114 may extend a predetermined distance from a surface Sb and Sa, respectively, of the handle sections 104b, 102b respectively such that the blades will only penetrate the wire W at a predetermined depth so that only the outer layer Wo of the wire W and not its inner core Wc is cut by the blades when the handle sections 102b, 104b are brought in proximity with one another as the handle section 102b is moved along directional arrow B and handle section 104b is moved along directional arrow A toward one another. The blades 112 and 114 may include fingers 112a, 114a respectively that define grooves therebetween. The grooves may be generally hemispherical and/or have a shape corresponding to that of about half of the circumference of the wire such that generally aligned grooves on generally opposing blades 112, 114 may securely receive the wire W therebetween.

A method of using the first multi-function wire stripping hand tool device 100 will now be described. As shown in FIGS. 2-3, the wire W may be placed between the handle sections 102b, 104b with the wire disposed between the blades 112, 114 therebetween. When the handle section 104b is moved along directional arrow D toward the other handle section 102b (as shown in FIG. 2), the blades 112, 114 move in generally opposing directions A, B toward and against the outer layer Wo of the wire W placed therebetween. With the blades 112, 114 are clamped down upon the wire W and cutting through the outer layer Wo, the outer layer Wo may be stripped away from the core Wc by pulling the wire W in direction C in a transverse direction away from the handle sections 102b, 104b.

Figure 4:
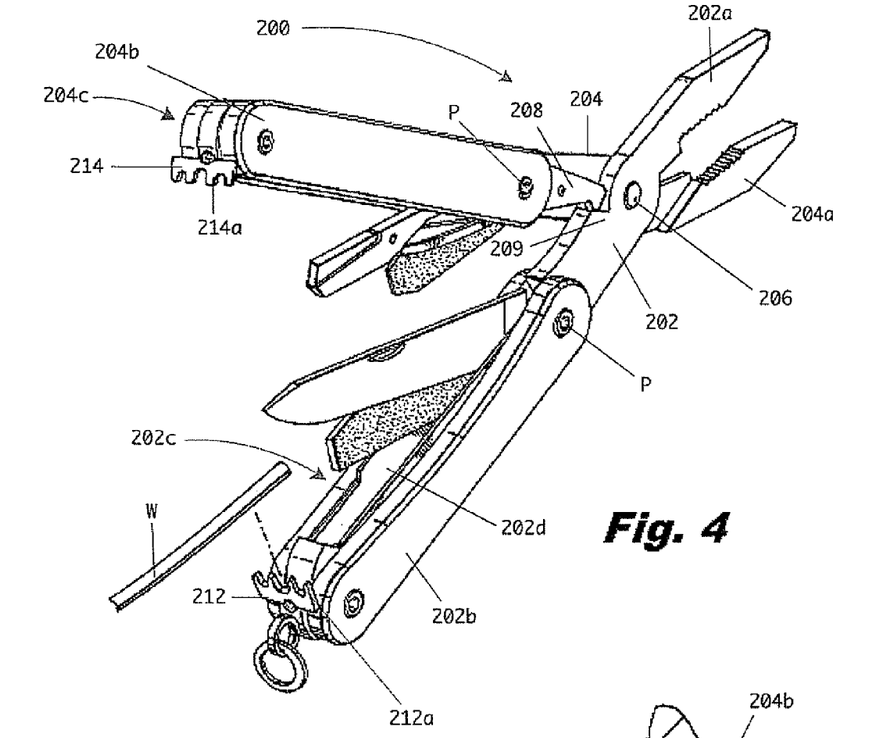
FIG. 4 is a perspective view of a second embodiment of a multi-tool device including a handle section having a wire stripping bit in accordance with the present disclosure shown in a first condition relative to an insulated wire.
Figure 5:
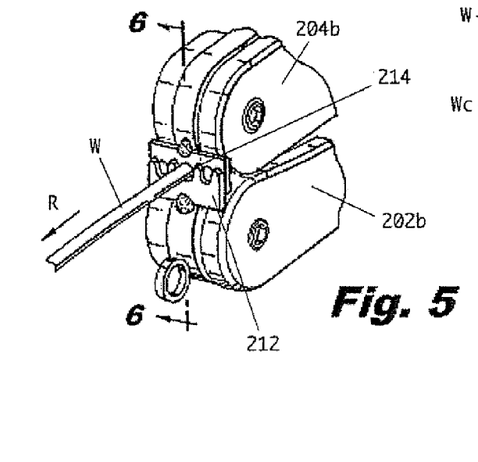
FIG. 5 is a cutaway perspective view of the device of FIG. 2 shown in a second condition engaging the insulated wire.
Figure 6:
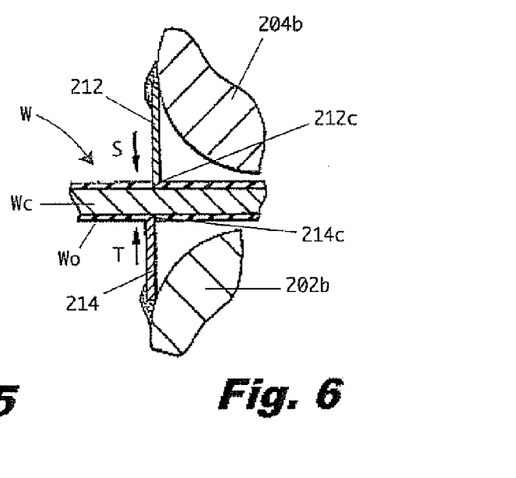
FIG. 6 is a cross-sectional view of the device as shown in FIG. 5 taken along section-line 5-5.
Figure 7:
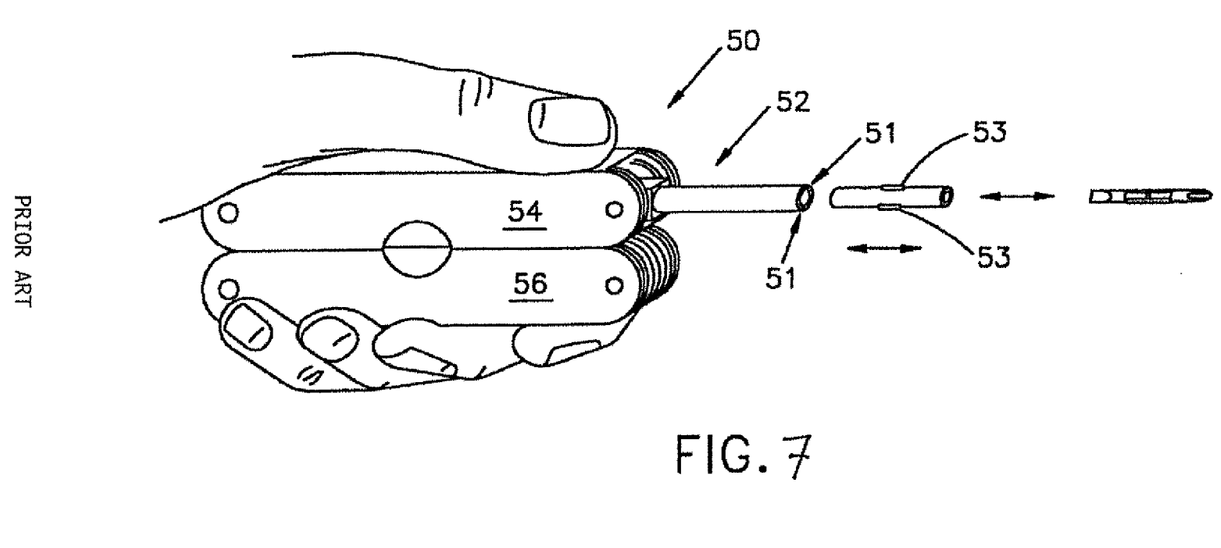
FIG. 7 is a perspective, partially exploded view of the improved hand/survival tool with multiple functions/purposes, and with a 4 in 1 interchangeable screwdriver shown in one of the hinged or folding blade-like implements forming part of the hand tool.
Figure 8:
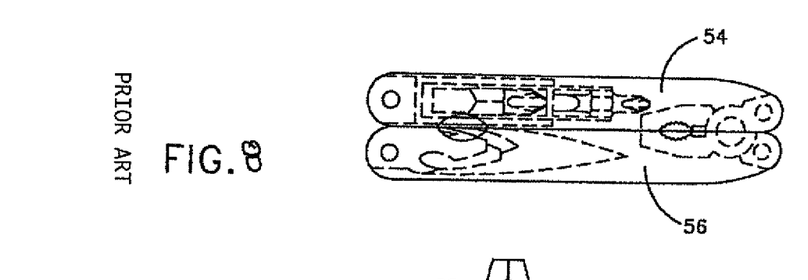
FIG. 8 is a side elevational view of the hand/survival tool shown in FIG. 7, but with all tool implements and/or blade-like devices folded into the pivoted and linked pair of handles (with all of the innards shown in phantom).
Figure 9:
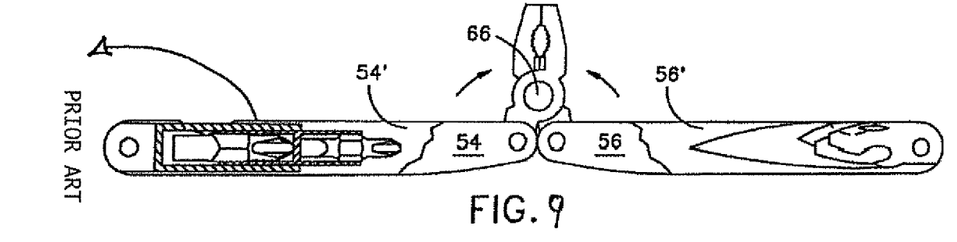
FIG. 9 is a side elevational view, similar to that of FIG. 8, but partially broken away, and showing both handles folded outwardly about 90 degrees.
Figure 10:
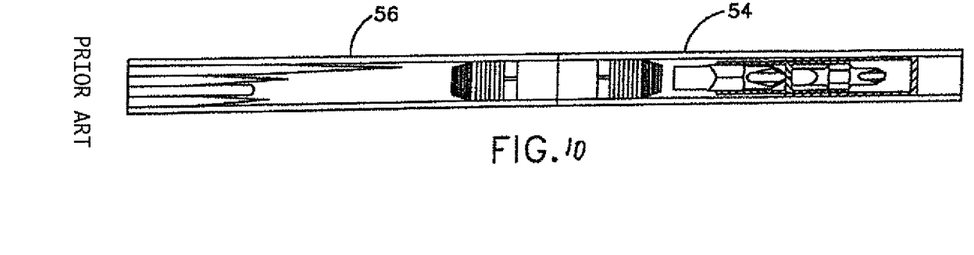
FIG. 10 is a bottom view or a view looking into the handle cavities or compartments and showing all of the tool implements and/or blade-like devices folded into their storage positions, and with the plier-like jaws shown also pivoted back into their respective portions of the handle cavities or compartments.
Figure 11:
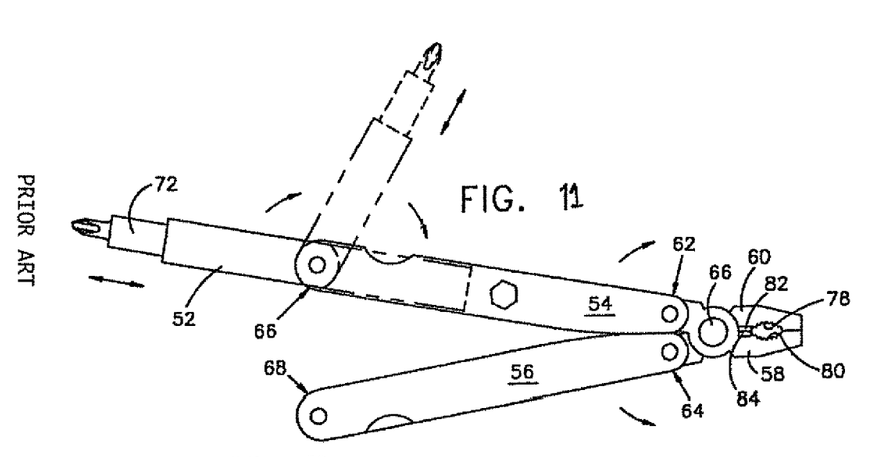
FIG. 11 is a side elevational view of the hand/survival tool shown in the Figs., but with both handles folded about 180 degrees from their stored/folded abutting position, and with a 4 in 1 screwdriver tool shown both in its locked, fully extended operative use position, and in phantom at about 75 degrees, and in its stored position without the 4 in 1 screwdriver tool.
Figure 12:
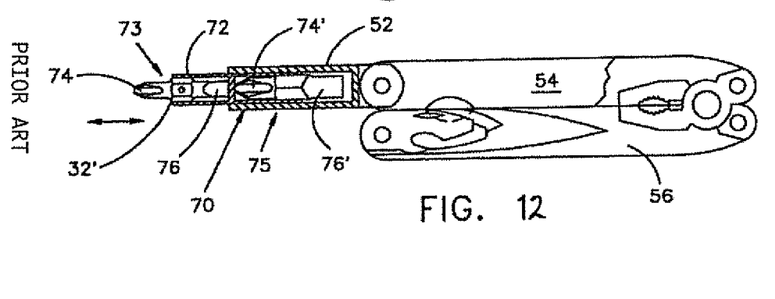
FIG. 12 is a side elevational view, similar to that of FIG. 15, but with the pair of handles, shown partly broken away, to illustrate the stored tool implements; and with the 4 in 1 screwdriver tool shown in section in its extended operative position for use by the user with one of the two sized Phillips head screwdriver bits.

Another embodiment of a multi-function wire stripping hand tool device 200 is substantially similar to the device 100 the ways described hereinbelow. As shown in FIGS. 4-6, the device 200 may include a first member 202 and a second member 204 that are pivotably connected to one another at pivot joint 206. The first member 202 may include a first jaw member 202a and a first handle section 202b. The second member 204 may include a second jaw member 204a and a second handle section 204b. The first handle section 202b may include a bit driver 202c that includes one or more bit chambers 202d. Similarly, the second handle section 204b may include a bit driver 204c that includes one or more bit chambers 204d. A tool bit, (e.g., scissors S, file M, file L, knife K) may be secured to the within one of the bit chambers 202d, 204d. The tool bits may be pivotably secured to the handle sections 202, 204 at their respective pivot joints P. When not being used, the tool bits may be aligned along the longitudinally extending axes of the handle sections 202, 204, and may be pivoted toward a useable position by pivoting or rotating the tool bit out from the bit chamber 202d in which it was positioned.

A biasing member 208 may be pivotably secured within the second handle section 204 and may be pivoted out from the second handle section 204 about a pivot joint P. The biasing member 208 may be shaped to engage a notch 209 formed in the first member when the biasing member 208 is so positioned. When so positioned, the biasing member 208 resists relative movement of the second handle section 204b toward the first handle section 202b such that the handle sections 204a, 204b will return automatically to the initial, radially spaced apart position as shown in FIG. 4.

A stripping mechanism may include a first stripping blade 212 and a second stripping blade 214. The blades 212, 214 are each configured to have a sharp or slanted edge 212c, 214c that can penetrate through the material forming the insulating layer Wo of the wire W. The first stripping blade 212 may be fixedly and rigidly secured at a proximal end of the first handle section 202b and disposed along a width thereof. Similarly, the second stripping blade may be fixedly and rigidly secured at a proximate end of the second handle section 204b and disposed along a length thereof. Consequently, the blades 212, 214 are always in an operative condition, i.e., they do not need to be transitioned to an operative condition, as is the case for the tool bits stored within bit chamber(s) 204d.

As shown in FIG. 6, the blades 212 and 214 may be generally parallel to one another, aligned along parallel but not collinear axes. Such an arrangement of the blades 212 and 214 may facilitate stable gripping of the wire W therebetween and stripping of the outer layer Wo of the wire W to expose its core Wc. The blades 212 and 214 may each have a length that will permit the blades to only penetrate the wire W at a predetermined depth so that only the outer layer Wo of the wire W and not its inner core Wc is cut by the blades when the handle sections 202b, 204b are brought in proximity with one another as the handle section 202b is moved along directional arrow S and handle section 204b is moved along directional arrow T toward one another. The blades 212 and 214 may include fingers 212a, 214a respectively that define grooves therebetween. The grooves may be generally hemispherical and/or have a shape corresponding to that of about half of the circumference of the wire such that generally aligned grooves on generally opposing blades 212, 214 may securely receive the wire W therebetween.

A method of using the first multi-function wire stripping hand tool device 200 will now be described. As shown in FIGS. 5-6, the wire W may be placed lengthwise between the handle sections 202b, 204b with the wire W disposed between the blades 212, 214 therebetween and within grooves defined between the respective fingers 212a, 214a of the blades. When the handle section 104b is moved in a direction relative toward the other handle section 102b, the blades 112, 114 move in generally opposing directions A, 13 (FIG. 6) toward and against the outer layer Wo of the wire W placed therebetween. With the blades 112, 114 are clamped down upon the wire W and cutting through the outer layer Wo, the outer layer Wo may be stripped away from the core Wc by pulling the wire W in direction R (FIG. 5) along the longitudinal axes of the handle sections 202b, 204b.

Additionally, the present invention incorporates fully by reference U.S. Pat. No. 6,119,561 (Anderson et al.) regarding a compact and pivoted multiple bit drive hand tool, and referring now to FIGS. 7-12, further improvements are discussed herein.

Referring now, and more particularly, to FIGS. 7-12, there is shown a number of alternate and improved modifications and alternate constructions of the hand tool of the invention with various implements generally pivotably mounted to at least the distal end of one of the tool handles. More particularly, as shown therein, the hand tool of FIGS. 7-12 is very much like the conventional Leatherman's plier tool, made and sold by the United States company known as the Leatherman Tool Group, Inc. However, here the improved hand/survival tool 50 embodies a tool having no loose parts, in addition to other conventional tools, knives, etc., either in a 4 in 1 or an 8 in 1 screw-nut driver tool (see incorporated content in U.S. Pat. No. 6,119,561) by the reference numeral 52, the only difference being that with the 8 in 1 tool, a longer handle would be required due to the need for a longer "master" inner sleeve 52, and a generally wider or bulkier handle due to the need for an outer holding sleeve and the reversible master inner sleeve and reversible "servant" sleeves having reversible driver tools and/or bit drivers, depending upon the length and diameter of the drive bits. It will be appreciated that the longer master or outer sleeve in an 8 in 1 tool securely holds and precludes rotation between itself and the shorter servant or inner sleeves of the pair of oppositely disposed 4 in 1 tool elements at the distal ends of the long inner sleeve. Nevertheless, it is also within the practice of the invention for the master and/or servant sleeves, as well as the screwdriver bits themselves to be either symmetrical or asymmetrical (long or short reach), similar to that applicant's other patents.

In FIGS. 7-12, the improved multipurpose hand tool 50 includes a pair of handles 54 and 56, which in the case of a Leatherman-like hand tool, both handles are pivotable to their respective jaws 58 and 60 at their front or proximal ends 62 and 64, with the movable jaws themselves being centrally pivotable about the tool's primary axis or pivot pin 66. While the jaws shown therein are illustrated as blunt at their ends ("cut-off" type), other various types of jaws are also applicable to the present invention, including the long nose type, where the jaws are generally more slender and elongated in shape, such as long nose pliers made and sold by the American Tool Companies of Kenosha, Wis., and DeWitt, Nebr., but without the over-toggle clamping means normally associated with a locking hand tool pliers.

Each of the folding handles 54 and 56 have a respective storage cavity 54' and 56' for storing a respective jaw 58 and 60, as well as the one or more tool implements pivotally mounted at the opposite distal jaw ends 66 and 68. One of the handles 54 may be suitably provided with either a 4 in 1 or 8 in 1 driver tool. In the illustrated embodiment of the improved hand tool of the invention, a 4 in 1 screwdriver 70 is shown, with its reversible sleeve or integral tube means 72 having a pair of reversible bits 73 and 75, removably seated at opposite ends in cavities or compartments, each reversible driver bit embodying a Phillips type screwdriver 74, 74' and a more conventional flat blade type screwdriver 76, 76' at opposite ends of the reversible bit driver. Both the reversible bits and the reversible sleeve or tube means 72 are suitably retained or held in place in their carriers by conventional means, such as biasable ball detents, suitable magnets, retaining clips, such as C or U-shaped and the like. In addition, a means are provided to prevent the reversible sleeve 72 from rotating relative to the pivotable, outer hollow tube 52, (e.g., a back stop backing member as shown) such as by conventional grooves in the outer sleeve and mating ears on the inner sleeve, or as shown in said figures by having the exterior of the sleeve 72 hexagonal in cross section so as to mate with the hexagonal interior of the hollow tube 52.

Furthermore, the reversible sleeve 72 itself is also provided with a hexagonal interior for matingly receiving and engaging a shoulder section 32' of the reversible bits so that rotational motion may be transmitted from the handles to the hollow tube 52 to the reversible sleeve 72 and to the reversible bit, and thence to the fastener (not shown) being driven or removed from a wall or surface in which the fastener is located.

At the proximal tool end are located the pivotable and mating jaws 58 and 60, both of which are movable in synchronism with each other. Each is provided with a mating jaw face having a suitable knurl or other gripping means (not shown) and teeth 78 and 80 for gripping a nut, rod, pipe or other object, and a cutter with anvil 82 and 84.

The other handle 56 is suitably equipped with any number of other pivotable tools, such as knives, bottle openers, screwdrivers, ruler-file, serrated saw, blade, scissors, awl-punch, fish scaler, can opener, Phillips or slotted screwdriver and the like. As shown therein, the four tools are a bottle opener/flat screwdriver, another flat blade screwdriver, file and awl-punch.

It this manner, it will be understood that the aspects and features of the hand tool system as shown in FIGS. 1-6 may be readily adapted to alternative types of hand tools as shown in FIGS. 7-12, without departing from the scope and spirit of the present invention. For example, tool bit holding members may be employed with the same type of wire-stripping members as shown elsewhere in here without departing from the scope and spirit of the present invention.

REFERENCE NUMERALS 100 is a first multi-function wire stripping hand tool device
102 is a first member of the multi-function wire stripping hand tool device 100.
102a is a first jaw member of the first member 102.
102b is a first handle section of the first member 102.
102c is a bit driver of the first handle section 102b.
102d is bit chamber of the bit driver 102c.
104 is a second member of the multi-function wire stripping hand tool device 100.
104a is a second jaw member of the second member 104.
104b is a second handle section of the second member 104.
104c is a bit driver of the second handle section 104.

106 is a pivot joint pivotably connecting the first member 102 and the second member 104.
108 is a biasing member.
109 is a notch.
110 is a notch configured to facilitate grasping of a tool bit.
112 is a first stripping blade.
112a is a finger of the stripping blade 112.
112c is a slanted edge of the stripping blade 112.
114 is a second stripping blade.
114a is a finger of the stripping blade 114.
114c is a slanted edge of the stripping blade 114.
P is a pivot joint.
M is a tool bit.
S is a tool bit.
K is a tool bit.
L is a tool bit.
W is an insulated wire.
Wo is an insulating layer of the insulated wire W.
Wc is a conductive core of the insulated wire W.
A is a directional arrow,
B is a directional arrow.
C is a directional arrow.
D is a directional arrow.
Sa is a side surface of the first handle section 102b.
Sb is a side surface of the second handle section 104b.
200 is a second multi-function wire stripping hand tool device.
202 is a first member of the second multi-function wire stripping hand tool device 200.
202a is a first jaw member of the first member 202.
202b is a first handle section of the first member 202.
202c is a bit driver of the first handle section 202b,
202d is a bit chamber of the bit driver 202c.
204 is a second member of the second multi-function wire stripping hand tool device 200.
204a is a second jaw member of the second member 204.
204b is a second handle section of the second member 204.
204c is a bit driver of the second handle section 204b.
206 is a pivot joint pivotably connecting the first member 202 and the second member 204.
209 is a notch.
212 is a first stripping bit.
212a is a finger of the first stripping blade 212.
212c is a slanted edge of the stripping blade 112.
214 is a second stripping blade.
214a is a finger of the second stripping blade 214.
214c is a slanted edge of the stripping blade 112.
R is a directional arrow.
S is a directional arrow.
T is a directional arrow.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A multi-function wire stripping hand tool, comprising:
a first member and a second member pivotably connected to one another, the first member including a first handle section having a width and a length, the second member including a second handle section having a width and a length, the first and second handle sections being configured for relative movement between a closed position and an open position;
a first bit driver coupled to the first handle section, the first bit driver including one or more first bit chambers for receiving one or more first tool bits in each of the one or more first bit chambers;
a second bit driver coupled to the second handle section, the second bit driver including one or more second bit chambers for receiving one or more second tool bits in each of the one or more second bit chambers; and
a wire stripping mechanism coupled to the first and second handle sections, the wire stripping mechanism comprising:
a first stripping blade secured the first handle section, the first stripping blade defining a first groove configured to receive a generally cylindrical length of wire therethrough; and
a second stripping blade secured to the second handle section the second stripping blade defining a second groove configured to receive the wire therethrough,
wherein relative movement of the first and second handle sections toward the closed position moves the first and second stripping blades closer to one another, and wherein the first and second grooves are aligned with one another such that the first and second grooves may cooperate to receive the wire therebetween and to apply a cutting force to a circumference of the wire, and
wherein the first stripping blade is secured to the first handle section along a first width of the first handle section, and the second stripping blade is secured to the second handle section along a second width of the second handle section.

2. The tool of claim 1, wherein the first member includes a first jaw member and the second member includes a second jaw member, the first and second jaw members being pivotably movable with respect to one another, wherein pivotal movement of the first and second handle sections closer to one another pivots the first and second jaw members closer together.

3. The tool of claim 1, wherein the first and second stripping blades are positioned relative to one another in a generally parallel, non-collinear orientation when the first and second handle sections are substantially in the closed position.

4. The tool of claim 3, wherein the first and second stripping blades each include a slanted end defining a plane, the planes of the slanted ends of the stripping blades being parallel to one another.

5. The tool of claim 1, wherein the first and second grooves have surfaces that are shaped to correspond to a curvature of the wire.

6. The tool of claim 1, wherein when the first and second handle sections are in the closed position relative one another, the aligned grooves of the first and second stripping blades retain a gap therebetween having a predetermined size, and wherein the first and second stripping blades are configured to cut only partially into the wire along a circumference thereof.

7. The tool of claim 1, wherein the wire has an outer layer and an inner core, and the first and second stripping blades are configured to cut through outer layer up to, but not through, the inner core of the wire when the wire is pressed between the first and second stripping blades.

8. The tool of claim 1, wherein the first handle section defines a first longitudinal axis and the second handle section defines a second longitudinal axis, at least some of the one or more first tool bits are pivotable out from the first bit chamber to a useable position relative to the first longitudinal axis of the first handle section, and at least some of the one or more second tool bits are pivotable out from the second bit chamber to a useable position relative to the second longitudinal axis of the second handle section.

9. The tool of claim 1, further comprising a biasing member that is positionable to bias ends of the first and second handle sections apart from one another.

10. The tool of claim 9, wherein the biasing member is retained within the second handle section and is pivotable to a useable position out from the second handle section, and wherein the first handle section is shaped and configured to engage the biasing member when the biasing member is in the useable position.

11. A kit for providing a multi-function wire stripping hand tool, comprising:
one or more first and second tool bits, each respective tool bit being engageable with said hand tool during a use; and
wherein the multi-function wire stripping hand tool comprises:
a handle having a first handle section having a width and a length, and a second handle section having a width and a length, the first and second handle sections are pivotably connected to one another and configured for relative movement between a closed position and an open position, wherein the first and second handle sections extend in a lengthwise direction;
a first bit driver coupled to the first handle section, the first bit driver including one or more first bit chambers for receiving one or more first tool bits in each of the one or more first bit chambers;
a second bit driver coupled to the second handle section, the second bit driver including one or more second bit chambers for receiving one or more second tool bits in each of the one or more second bit chambers; and
a wire stripping mechanism coupled to the handle, the wire stripping mechanism comprising:
a first stripping blade secured the first handle section, the first stripping blade defining a first groove configured to receive a generally cylindrical length of wire therethrough; and
a second stripping blade secured to the second handle section the second stripping blade defining a second groove configured to receive the wire therethrough,
wherein relative movement of the first and second handle sections toward the closed position moves the first and second stripping blades closer to one another, and wherein the first and second grooves are aligned with one another such that the first and second grooves may cooperate to receive the wire therebetween and to apply a cutting force to a circumference of the wire, and
wherein the first stripping blade is secured to the first handle section along a first width of the first handle section, and the second stripping blade is secured to the second handle section along a second width of the second handle section.

12. The kit according to claim 11, wherein the one or more first and second tool bits are selected from the group consisting of a flat head screwdriver bit, a crossed head screwdriver bit, a hexagonal nut head, a pointed head, a saw blade, a knife, a file, and a scissor.

13. A multi-function wire stripping hand tool, comprising:
a first member and a second member pivotably connected to one another, the first member including a first handle section having a width and a length, the second member including a second handle section having a width and a length, the first and second handle sections being configured for relative movement between a closed position and an open position;
a first bit driver coupled to the first handle section, the first bit driver including one or more first bit chambers for receiving one or more first tool bits in each of the one or more first bit chambers;
a second bit driver coupled to the second handle section, the second bit driver including one or more second bit chambers for receiving one or more second tool bits in each of the one or more second bit chambers; and
a wire stripping mechanism coupled to the first and second handle sections, the wire stripping mechanism comprising:
a first stripping blade secured the first handle section, the first stripping blade defining a first groove configured to receive a generally cylindrical length of wire therethrough; and
a second stripping blade secured to the second handle section the second stripping blade defining a second groove configured to receive the wire therethrough,
wherein relative movement of the first and second handle sections toward the closed position moves the first and second stripping blades closer to one another, and wherein the first and second grooves are aligned with one another such that the first and second grooves may cooperate to receive the wire therebetween and to apply a cutting force to a circumference of the wire,
wherein the first stripping blade is secured to the first handle section along a first width of the first handle section, and the second stripping blade is secured to the second handle section along a second width of the second handle section, and
wherein the first and the second handle sections each include an outer side surface, and wherein the first stripping blade is recessed with respect to the outer side surface of the first handle section and the second stripping blade is recessed with respect to the outer side surface of the second handle section.

* * * * *